US011074592B2

(12) United States Patent
Stonehouse et al.

(10) Patent No.: US 11,074,592 B2
(45) Date of Patent: Jul. 27, 2021

(54) METHOD OF DETERMINING AUTHENTICITY OF A CONSUMER GOOD (71) Applicant: The Procter & Gamble Company, Cincinnati, OH (US)

(72) Inventors: Jonathan Richard Stonehouse, Windlesham (GB); Boguslaw Obara, Bowburn (GB)

(73) Assignee: The Procter & Gamble Company, Cincinnati, OH (US)

(*) Notice: Subject to any disclaimer, the term of this patent is extended or adjusted under 35 U.S.C. 154(b) by 78 days.

(21) Appl. No.: 16/297,777

(22) Filed: Mar. 11, 2019

(65) Prior Publication Data

US 2019/0392458 A1 Dec. 26, 2019

Related U.S. Application Data

(60) Provisional application No. 62/687,809, filed on Jun. 21, 2018.

(51) Int. Cl.
*G06K 9/00* (2006.01)
*G06Q 30/00* (2012.01)
*G06N 20/00* (2019.01)
*G06K 7/14* (2006.01)
*G06K 9/62* (2006.01)
*G06K 19/06* (2006.01)

(52) U.S. Cl.
CPC ....... *G06Q 30/0185* (2013.01); *G06K 7/1447* (2013.01); *G06K 9/6256* (2013.01); *G06K 19/06178* (2013.01); *G06N 20/00* (2019.01)

(58) Field of Classification Search
CPC .. G06Q 30/0185; G06N 20/00; G06K 7/1447; G06K 9/6256; G06K 19/06178
See application file for complete search history.

(56) References Cited

U.S. PATENT DOCUMENTS

| | | | |
|---|---|---|---|
| 8,755,837 B2 * | 6/2014 | Rhoads | G06K 9/00577 455/556.1 |
| 9,443,179 B2 | 9/2016 | Meadows | |
| 9,521,291 B2 * | 12/2016 | Holub | G06K 9/66 |
| 9,846,814 B1 * | 12/2017 | Fraser | G06K 9/00046 |
| 9,892,301 B1 * | 2/2018 | Holub | G06T 1/005 |
| 9,940,515 B2 * | 4/2018 | Callegari | G06K 9/20 |
| 10,482,471 B2 * | 11/2019 | Herrington | G06Q 30/018 |
| 10,949,907 B1 * | 3/2021 | Jain | G06Q 30/0627 |
| 2011/0280480 A1 | 11/2011 | Simske | |

(Continued)

FOREIGN PATENT DOCUMENTS

| | | |
|---|---|---|
| CN | 106469336 A | 1/2017 |
| CN | 104573688 B | 8/2017 |

(Continued)

OTHER PUBLICATIONS

International Search Report and Written Opinion dated Aug. 16, 2019, 12 pgs.

*Primary Examiner* — Gregory M Desire
(74) *Attorney, Agent, or Firm* — Amanda T Barry; David M Weirich (57) ABSTRACT

An economical and accurate method of classifying a consumer good as authentic is provided. The method leverages machine learning and the use of steganographic features on the authentic consumer good.

18 Claims, 6 Drawing Sheets

(56) References Cited

U.S. PATENT DOCUMENTS

| | | | |
|---|---|---|---|
| 2016/0110630 A1* | 4/2016 | Heusch | G06K 9/6255 |
| | | | 382/160 |
| 2016/0169818 A1 | 6/2016 | Martin | |
| 2016/0283975 A1 | 9/2016 | Kaul | |
| 2017/0032285 A1* | 2/2017 | Sharma | G06N 3/0454 |
| 2017/0316477 A1* | 11/2017 | Prasad | G06Q 50/01 |
| 2019/0197358 A1* | 6/2019 | Madani | G06N 3/0481 |
| 2019/0392458 A1* | 12/2019 | Stonehouse | G06K 9/6274 |

FOREIGN PATENT DOCUMENTS

| | | |
|---|---|---|
| CN | 107563774 A | 1/2018 |
| WO | WO2015157526 A1 | 10/2015 |
| WO | WO2016157172 A2 | 10/2016 |

\* cited by examiner

Hello — 21

Fig. 2a

Hello — 23

Fig. 2b

Hello — 25

Fig. 2c

Hello — 27

Fig. 2d

Hello — 29

Fig. 2e

Hello — 31

Fig. 2f

Hello — 33

35 — Fig. 2g

Hello — 37

METHOD OF DETERMINING AUTHENTICITY OF A CONSUMER GOOD

FIELD OF THE INVENTION

The present invention relates to an economical way of determining the authenticity of a consumer good.

BACKGROUND OF THE INVENTION

Counterfeiting is a worldwide problem. It economically harms consumers and manufacturers and can pose safety concerns to consumers. Overt technologies such as holograms, and covert technologies like taggants have been proposed. But these technologies are expensive to implement and/or require specialized equipment and/or specialized skills/training. This is particularly problematic for fast moving consumer goods that generally have low margins (e.g., laundry detergent, shampoo, body wash, diapers, etc.) and thus require solutions that are cost effective. Moreover, end-users (i.e., consumers) want a solution that is easy to implement/understand, while manufactures want one that is inexpensive and reasonably accurate.

One proposed approach to authenticating products is based on imaging microscopic variations and the use of machine learning. However, this approach may have certain disadvantages such as the potential need for specialized equipment to capture images on a microscope scale (e.g., analyzing microscopic variations at the 10 micrometer range), the need to capture a plurality of images from different aspects of the subject consumer good (thereby requiring significant effort, that is, a high barrier to adoption, by the end-user), model complexity given the need to identify features on a microscopic scale (thereby reducing processing speed/response time).

Accordingly, there is a need for a cost-effective solution that provides reasonable accuracy and leverages consumer ubiquitous equipment and technology such as a smart phone.

SUMMARY OF THE INVENTION

The present invention is based on the surprising discovery that using steganographic features in product specification(s) coupled with machine learning can result in a low cost, user friendly, and accurate counterfeit detecting method/system. Based upon unpublished internal benchmarking studies comparing with sticker/tags with the present invention through the lens of consumer adoption, the present invention provides a more cost-effective approach to stopping counterfeits with a better return on investment for manufacturers.

One aspect of the invention provides a method for classifying whether a subject consumer good is authentic or non-authentic. The method steps comprise: (a) obtaining an image of the subject consumer good comprising a subject product specification; (b) inputting the obtained image into a model; and (c) outputting output from the model classifying the inputted image of the subject consumer good as authentic or non-authentic. The model is configured to classify the obtained image as authentic or non-authentic. The model is constructed by a machine learning classifier. The machine learning classifier is trained by a training dataset. The training dataset comprises: (i) at least one extracted image of an authentic product comprising an authentic product specification, wherein said authentic product specification comprises at least one steganographic feature having a length greater than 0.01 mm; and (ii) an associated class definition based on said steganographic feature (of said authentic product specification of said authentic product).

Another aspect of the invention provides for a method for classifying whether a subject consumer good is authentic or non-authentic. The method steps comprise: (a) obtaining an image of the subject consumer good comprising a subject product specification; (b) inputting the obtained image into a model; and (c) outputting output from the model classifying the inputted image of the subject consumer good as authentic or non-authentic. The model is configured to classify the obtained image as authentic or non-authentic. The model is constructed by a machine learning classifier. The machine learning classifier is trained by a training dataset. The training dataset comprises: (i) at least one extracted image of an authentic product comprising an authentic product specification, wherein said authentic product specification comprises Manufacturing Line Variable Printing Code (defined below); and (ii) an associated class definition based on said Manufacturing Line Variable Printing Code (of said authentic product specification of said authentic product).

A potential advantage is to reduce model complexity and thus response time by providing training the machine learning classifier on a scale larger than 10 micrometers.

Another potential advantage is that anyone along the distribution chain to determine whether a subject consumer product is authentic or not provides for multiple points along the chain to police and stop counterfeiters before economic harm or product safety is inflicted by the counterfeits.

Another advantage is a cost that is cheaper, easier to implement and more adaptable than the use of QR code scannable system which requires generating, finding space to add a QR code on the product, and data basing the QR code.

These and other features, aspects, and advantages of the present invention will become evident to those skilled in the art from the detailed description which follows.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

FIG. 1b is a flow diagram further detailing the training data set included in FIG. 1a;

FIGS. 2b-2h are examples of stenographic features deliberated provided to the alphanumeric text of FIG. 2a;

DETAILED DESCRIPTION OF THE INVENTION

The following text sets forth a broad description of numerous different embodiments of the present disclosure.

The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

Definitions

The term "comprising" as used herein means that steps and ingredients other than those specifically mentioned can be added. This term encompasses the terms "consisting of" and "consisting essentially of." The compositions of the present invention can comprise, consist of, and consist essentially of the essential elements and limitations of the invention described herein, as well as any of the additional or optional ingredients, components, steps, or limitations described herein.

As used herein, the articles including "a" and "an" when used in a claim, are understood to mean one or more of what is claimed or described.

As used herein, the words "preferred", "preferably" and variants refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

A method for classifying whether a subject consumer good is authentic or non-authentic is provided.

Model

Figure 1A:
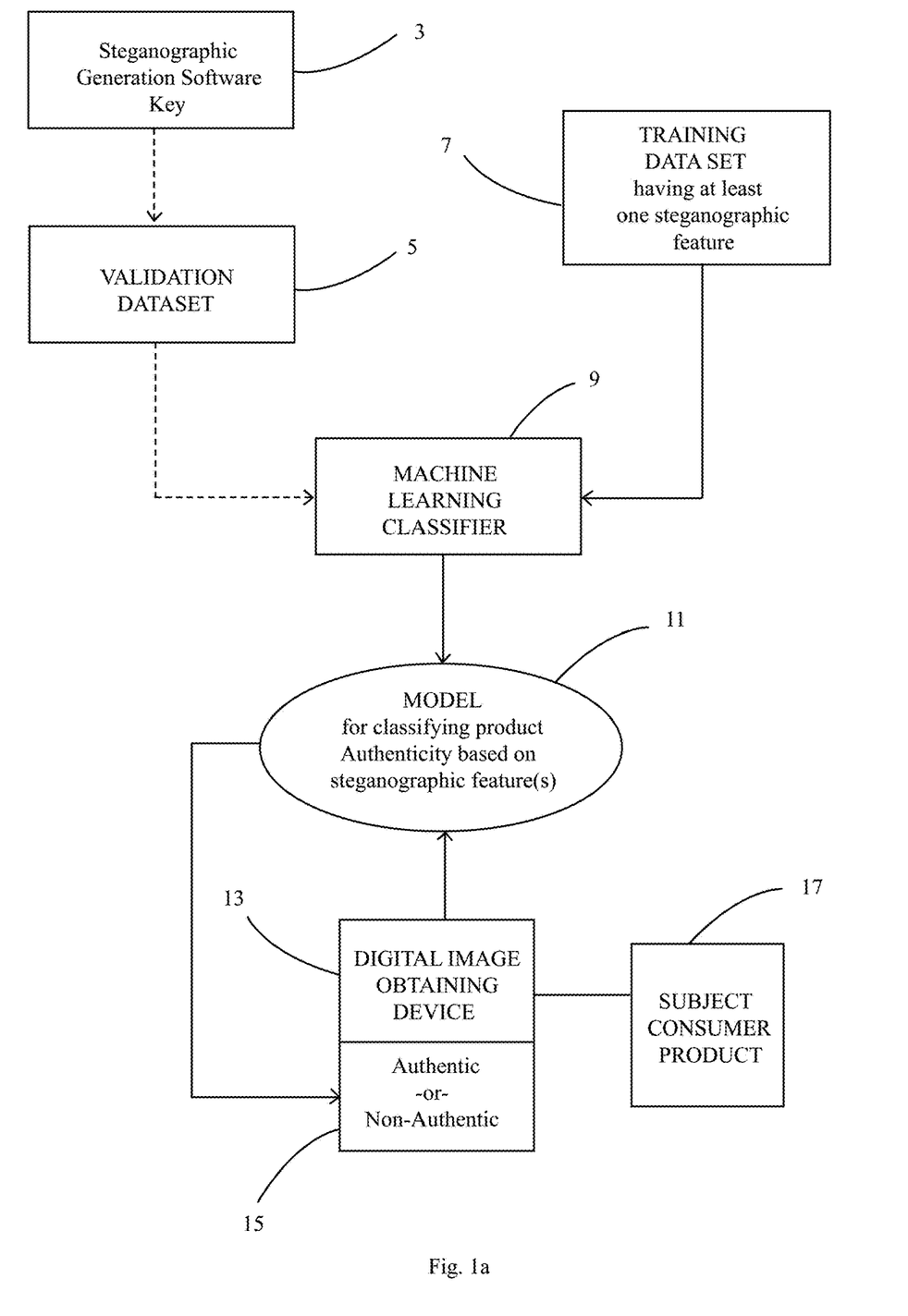
FIG. 1a is a flow diagram of a method of the present invention with specific mention to a training data set.
Figure 1B:
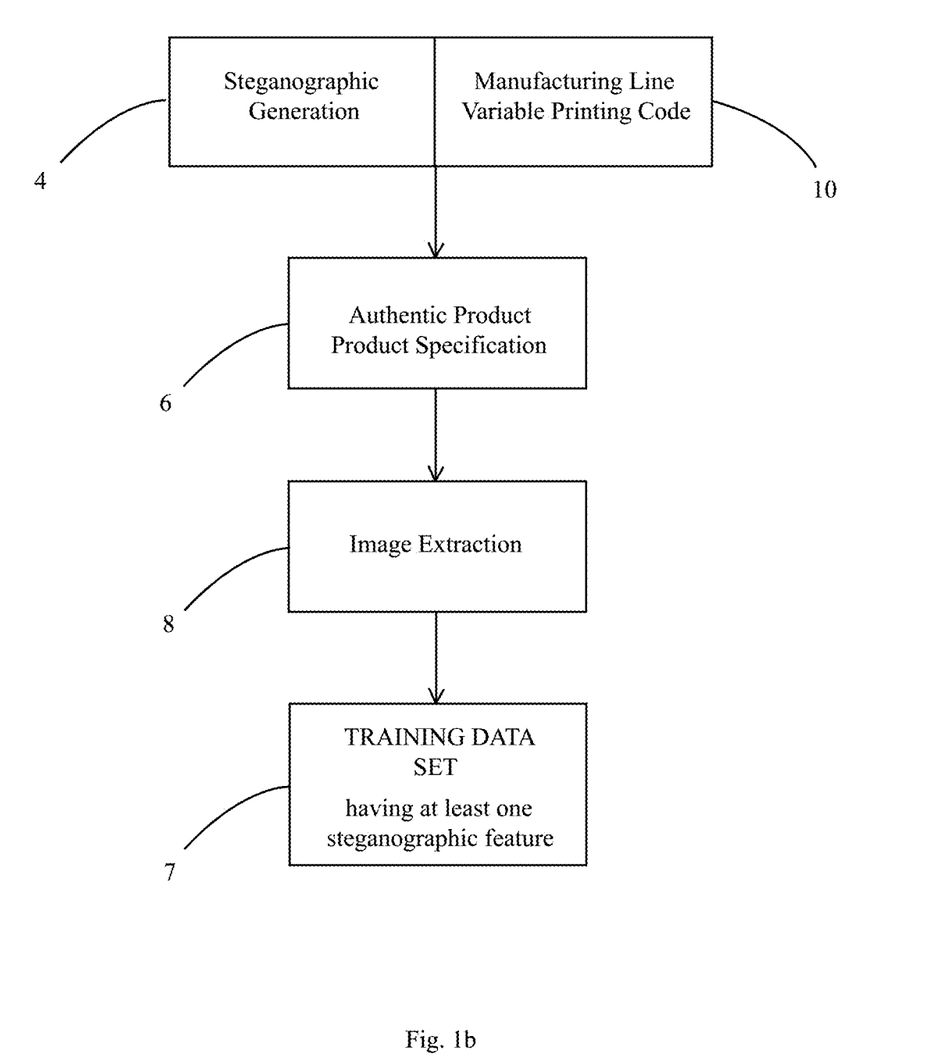

Referencing FIG. 1a, a model (11) is provided that is configured to classify an image of a subject product (17) comprising a specification as authentic or non-authentic (15). The model (11) is constructed by a machine learning classifier (9). The constructed model (11) is capable of image classification. That is, a digital image (obtained from a digital image obtaining device (13)) of a subject consumer product (17) and its specification is inputted into the constructed model (11) which outputs at least one classification that best describes the digital image. Specifically, the at least one classification classifies whether the subject consumer product (17) is authentic or non-authentic (15). The model (11) is constructed by a machine learning classifier (9). One or more such machine learning classifiers (9) can be used. The machine learning classifier (9) is trained by a training dataset (9). The training dataset is further described in FIG. 1b. Preferably the machine learning classifier (9) is further validated and improved by a validating dataset (5) and/or a testing dataset (not shown). Non-limiting examples of one or more machine learning classifiers (9) include anomaly detection systems/techniques and the like. Preferably the machine learning classifier (9) is a neural network, more preferably a convolutional neural network ("CNN"). A non-limiting example of a CNN is a Wasserstein Deep Convolutional Generative Adversarial Network. CNN is a specialized kind of neural network for processing data in grid-like topology. The network uses a mathematical operation of convolution to extract a set of features from the input image. The first layer of the CNN learns to recognize simple patterns, middle layers more complex patterns, while later layers locate and recognize major objects in the image (e.g., brand name)

The first layer of a CNN is a convolutional layer. The input into the CNN is an array of pixel values (e.g., height, width, intensity) from an image. More than one convolution layer is used. A nonlinear layer (or activation layer) is typically used after each convolutional layer. To this end, a rectified linear units (ReLU) layer is preferred. Pooling layers (also known as a down sampling layer) may be included, preferably after each ReLU layer. These pooling layer(s) reduce the spatial dimension of the input volume, which can help with computation cost and help to control overfitting. Overfitting means the model is overly tuned to the training dataset such that it is not able to generalize well for the optional validating and/or testing datasets. One approach to address overfitting is by way of dropout. A dropout technique is essentially a regularization method used to prevent over-fitting while training neural nets. Preferably there is more drop out of the deeper layers so the higher frequency features are learned better. A fully connected layer is at the end of the CNN. This layer takes input (from the immediately preceding layer) and outputs an n dimensional vector where n is the number of classes that the model must choose from. In other words, the machine learning classifier preferably comprises a n-layer CNN which learns distinguishing features based on the depth of the n-layers. Preferably the machine learning classifier comprises assembling n-layered CNN and classifying the image as a combination of output probabilities of each of the n-layered convolutional networks. For example, the n-layered CNN can be a 4-layer, 6-layer, 8-layer, 12-layer, or 16-layer network.

The machine learning classifier is trained by a training dataset. In turn and referencing FIG. 1b, the training dataset (7) comprises extracted image(s) of an authentic product (8) comprising an authentic product specification (6), wherein the authentic product specification (6) comprises at least one steganographic feature (4) having a length greater than 0.01 mm. The training dataset (7) further comprises an associated class definition based on the steganographic feature of the authentic product specification of the authentic product (not shown). Alternatively, or in addition, the training dataset comprises extracted images of an authentic product specification, wherein the authentic product specification comprises a Manufacturing Line Variable Printing Code (10) (defined below). In this example, the training dataset further comprises an associated class definition based on the Manufacturing Line Variable Printing Code (not shown).

"Steganographic feature" means an alphanumerical, graphical, structural feature, or the like, that is that is deliberately added to the physical consumer good as to be plainly visible detectable on the consumer good but preferably does not attract attention. Preferably the steganographic feature is large enough as to not require microscopy to be visible. An advantage of features that are larger than a microscopic level is that ability to detect them by a typical smart phone or other standard device that many consumers routinely carry with them. More preferably the steganographic feature has a length (i.e., longest dimension) from 0.02 mm to 20 mm, more preferably from 0.03 mm to 5 mm, yet more preferably from 0.04 mm to 1 mm Non-limiting examples of this length include 0.03 mm, 0.05 mm, 0.07 mm, 0.09 mm, 0.1 mm, 0.2 mm, 0.3 mm, 0.4 mm, 0.5 mm, and 0.6 mm.

Figure 2A:
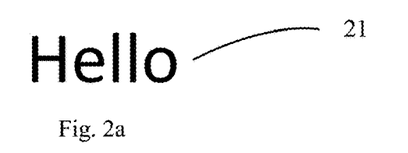
FIG. 2a is an example of an alphanumeric text in the form of the word "Hello"
Figure 2B:
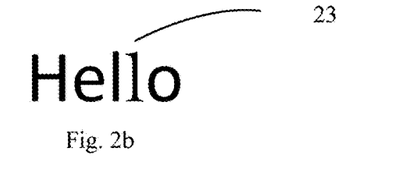
Figure 2C:
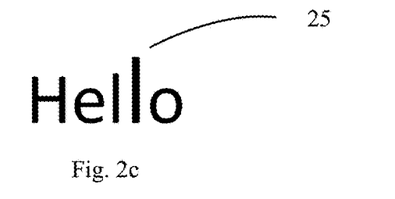
Figure 2D:
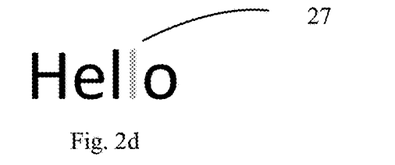
Figure 2E:
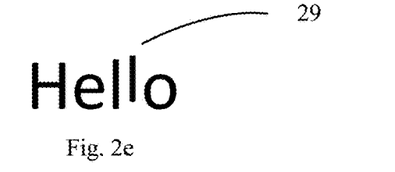
Figure 2F:
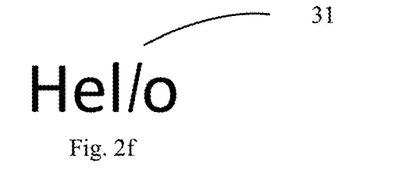
Figure 2G:
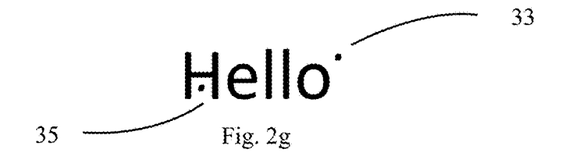
Figure 2H:
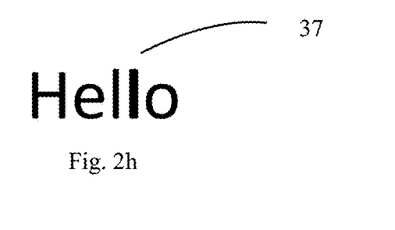

"Alphanumerical steganographic feature" is a feature associated with letters, numbers, punctuation, characters, and the like. FIG. 2a-2h are non-limiting examples directed to the word "Hello." FIG. 2a is control example where the word "Hello" (21) is typed in standard font and font size. FIG. 2b is an example where the second "l" (23) is in a different style as compared to the other letters of the word. FIG. 2c has the second "l" (25) is a larger font size. This "l" can be bolder or alternatively even a smaller size as compared to the other letters of the word. FIG. 2d is an example where the second "l" (27) is a color or shading or grayscale intensity that is different as compared to the other letters of the word. In FIG. 2e the second "l" (29) is shifted slightly upwards as comparted to the other letters of the word. Alternatively, this shifting can be down, left, right, or combinations thereof. In FIG. 2f, the second "l" (31) is italicized. In FIG. 2g, there is are marks (33, 35) (alternatively a character or punctuation) that are randomly placed next to the letter "H" (35) and next to the letter "o" (33). In another example, not show, a period that is placed in slightly elevated position as compared to a customary placement. In FIG. 2h, the second letter "l" (37) is bolded. Alternatively, the letter can be un-bolded (relatively to the other letters of the word). Other examples may include "cutting" a small section of a logo.

Figure 3:
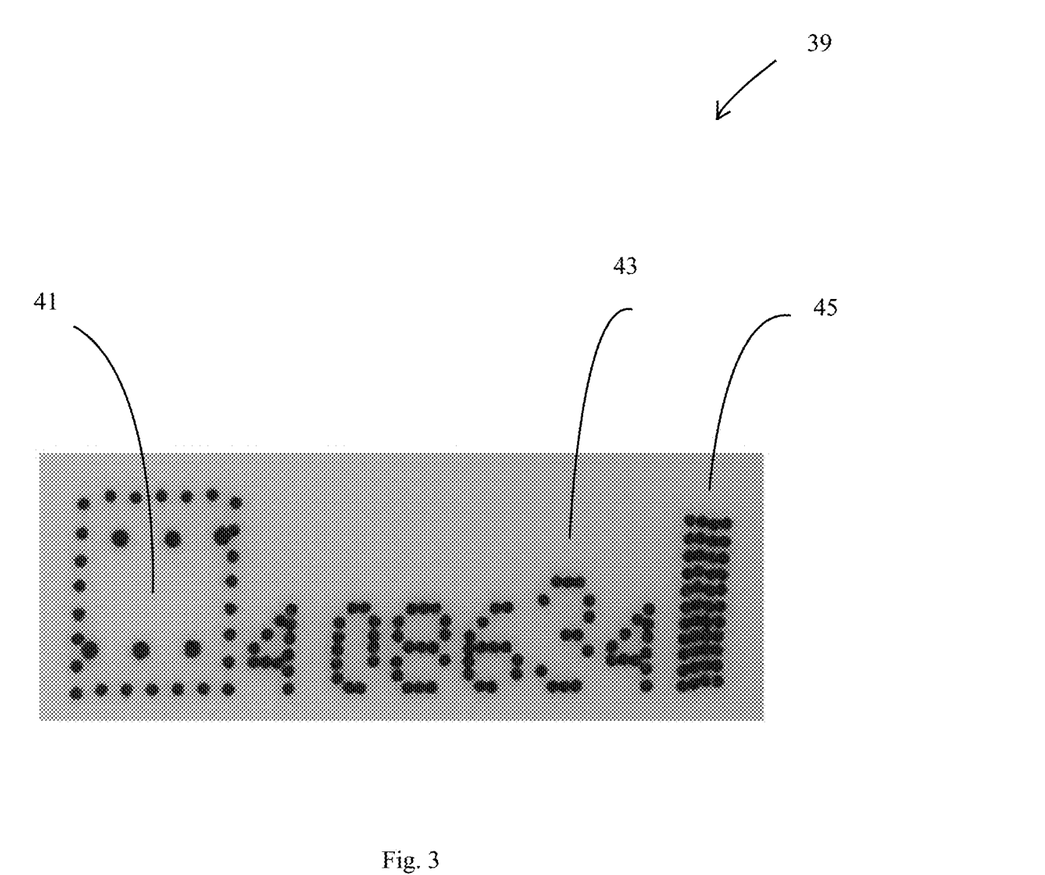
FIG. 3 is an example of Manufacturing Line Variable Printing Code (that may or may not have a stenographic feature)

FIG. 3 is an example of Manufacturing Line Variable Printing Code ("Code") (39). This Code (39) may have alphanumeric characters or non-alphanumeric characters or combinations thereof. In FIG. 3, the alphanumeric characters are specifically "408634." This Code is printed while the consumer product is being manufactured, preferably as one of the last steps before being packed for shipping. The Manufacturing Line Variable Printing Code is printed by a printing method selected from: continuous ink-jet; embossing, laser etching, thermal transferring, hot waxing, and combinations thereof; preferably continuous ink-jet. Continuous ink-jet is typically black ink, where characters are made up of small drops or dots. Embossing is typically seen in bags or carton packaging. Laster etching is typically used on plastic, metal, or cardboard. Thermal transferring is typically seen in label or flexible packaging. Hot waxing is seen, for example, in some diaper products. The Code is variable because the exact character(s) may change from time to time to address variables such as expiration date of the product, production date of the product, lot numbers, etc. The Code can serve other functions such as identify the manufacturing plant, or a unique product identifier. The Code may or may not contain a steganographic feature. For example, the number "3" (43) is slightly larger than the other numbers. It is surprisingly observed that given the conditions of the manufacturing line (e.g., high speed), the variability between printers and substrates, the characteristics of the ink itself that the Codes often great unique "fingerprints" with features, of example, of magnitudes of 0.1-0.5 mm in length (i.e., long dimensions) and can be form valuable part of the training dataset (alternatively, or in addition, the validating or testing dataset(s)). Preferably each character has a length (i.e., longest dimension) form 2 mm to 50 mm, alternatively from 10-30 mm, or from 5-15 mm, or from 20-50 mm.

Figure 4:
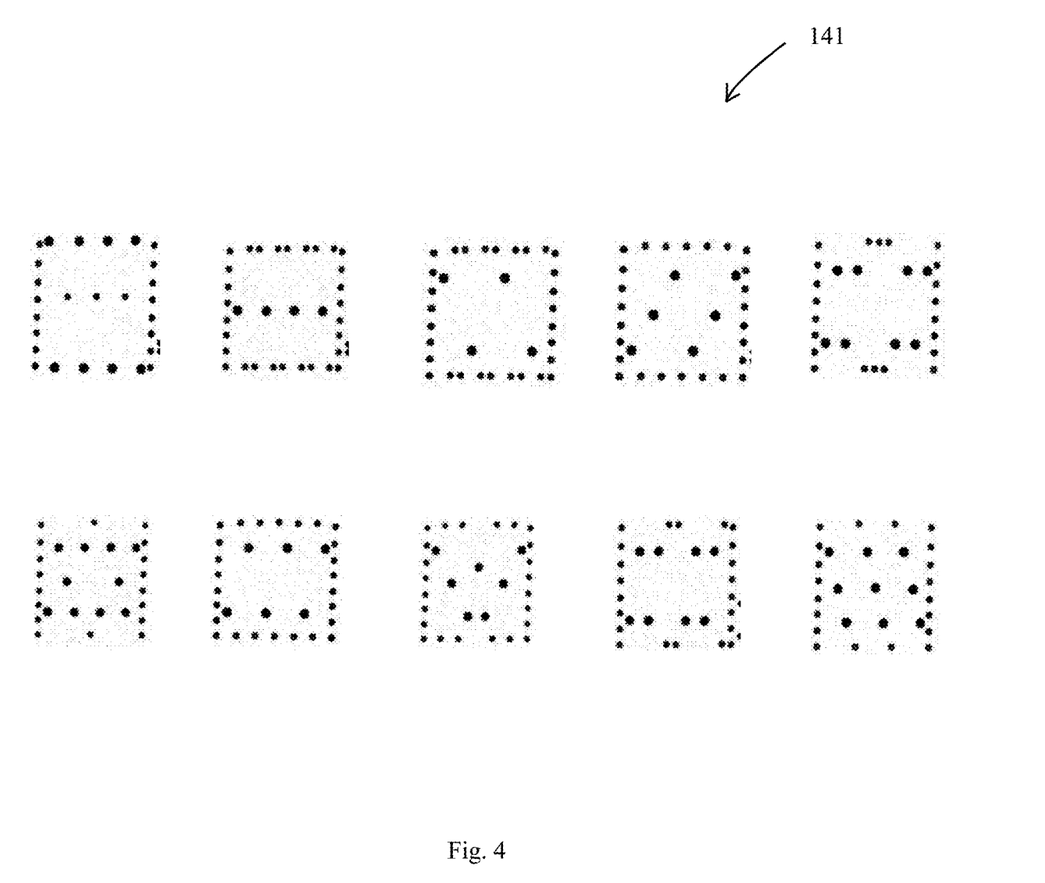
FIG. 4 is a first example of a non-alphanumeric character of the Code from FIG. 3.
Figure 5:
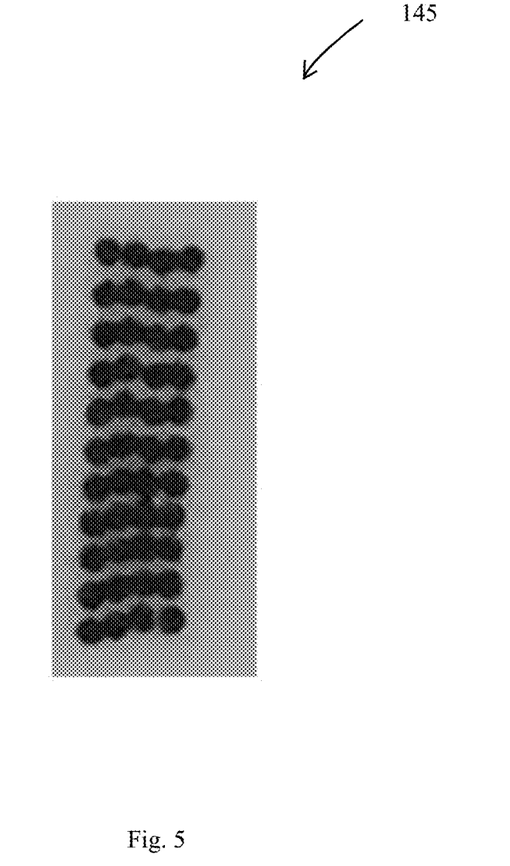
FIG. 5 is a second example of a non-alphanumeric character of the Code from FIG. 3.

"Graphical steganographic feature" is a feature that is typically associated with artwork, graphics, or even nonsensical patterns or markings. In one example, a small portion of a graphic is "cut". In another example, turning to back to FIG. 3, the Manufacturing Line Variable Printing Code comprises a non-alphanumeric character, such as a patterned box made from dots (41) and a dotted column (45) are provided as part of a manufacturing (batch) code. FIG. 4 are different examples of the pattern box (141) than may be used. FIG. 5 is an example of a dotted column (145). The numbers can be printed from different fonts or font styles. The numbers can be stretched or shrunk and the dots or lines that comprises the number or letter can be arranged manner that that are not evenly spaced. This includes overlapping dots/lines or even "missing" dots or discontinuous lines. Generally, given the degree and amount of "errors" in the Code (whether these errors are deliberately made or inherently by the printing process), regardless provides a unique "fingerprint" for authentic products so that the methods and systems herein described can determine non-authentic products with a high speed and/or accuracy.

Many of these steganographic features can be automatically deliberately generated by software, such as bespoke plug-ins for Adobe Illustrator in the case of steganographic features in artworks, or modification to software controlling the online printers or the online printing software itself for steganographic features in the manufacturing line variable printed code. In one example, as illustrated in FIG. 1a, a validating dataset (5), training dataset (7), testing dataset (not shown), or combination thereof, preferably only the validating dataset (5), comprises a key from the automated stenographic feature generating software (3) identifying the features. In another example, a validating dataset, training dataset, or combination thereof, preferably only the validating dataset, comprises using information about the characteristic of the Manufacturing Line Variable Printing Code. This way the model knows what these stenographic features are and where these stenographic features are located (and can weigh them in the model as appropriate). In other words, the training dataset further comprises identification of the steganographic feature(s) of the product specification (of the authentic consumer good) generated by steganographic feature generating software.

"Structural feature" is one where the feature is part of the packaging itself (vs. printed). This may include a feature that is part of the bottle, i.e., designed as part of the bottle mold. The feature can be a deliberated placed small protrusion or recession or combination thereof (e.g., pattern or texture). In another example, the structural feature is a unique portion of a seal of a bag (e.g., a small section of a unique pattern in the context of an otherwise much larger standard pattern). In yet another example, the feature is a small cut-out made into the edge of the bag (e.g., in the seal portion). In yet another example, the cardboard packaging of a product is embossed (e.g., with a pattern or texture).

Preferably the one or more product specifications comprise a plurality of steganographic features, preferably greater than 10, 15, 20, 25, 30 or more such features are used in the product description, alternatively from 5 to 100, or from 10 to 90, or from 20 to 70. Preferably at least two of the following steganographic feature types are used: textual steganographic feature; graphical steganographic feature; and structural feature. Alternatively, all three of such types are used.

An advantage of having a plurality of steganographic features and feature types is the ability to detect counterfeits with better accuracy given that more "fingerprints" are available for detection by the model and/or given flexibility that the image obtained need not be from a single rigid vantage point. In other words, accuracy is relatively high regardless of what perspective the image is taken of the product.

Preferably the training dataset comprises an annotation annotating the steganographic feature or Manufacturing Line Variable Printing Code. The annotations, to the images forming a part of the training dataset, provides details or characteristics of said features or Codes. This may help the model learn. The annotation may be individual sourced or crowd sourced. For example, when crowd sourced, if three more contributors independently annotate the same image, and standard deviation is reasonably low, the annotation is accepted into the model. The approach can also be used as part of a validation step. Alternatively, the training set is augmented to emphasize said feature or Code.

The consumer good, to which is authenticity is determined, can be essentially any consumer good that is sold in commerce. Non-limiting examples of consumer goods include medicine, prescription drugs, airplane parts, food, beverages, automobile parts, and the like. Preferably the consumer good a fastmoving consumer good. Non-limiting examples include fabric care products (e.g., laundry detergent, fabric softener), home care product (e.g., dishwashing detergent, disposable duster), baby care products (e.g., diaper), beauty care products (e.g., shampoo, skin cream, antiperspirant), family care products (e.g., facial tissue, disposable towel), feminine care products (e.g., tampon, sanitary napkin), heath care products (e.g., toothpaste, toothbrush, over-the-counter cough and cold medicine, vitamin, gastrointestinal remedy).

The training dataset preferably also comprises at least one image extracted from at least a non-authentic consumer good and its product specification, and an associated class definition based on the absence of the least one steganographic feature in the product specification of the non-authentic consumer good. The optional validation dataset may also contain images extracted from non-authentic physical consumer good and its product specification, and an associated class definition based on the absence of the least one steganographic feature in the product specification of the non-authentic physical consumer good.

Preferably the dataset (i.e., training and/or validation datasets) is spatially manipulated before the machine learning classifier is trained. More preferably the data set is spatially manipulated by a Spatial Transformer Network ("STM"). STM is a learnable module that learns to select the correct region of the input image data, rotate that portion of the image to normalize the pose, and scale the cropped region before inputting into the machine learning classifier. For example, interfering features of the background of the input image data are removed. The geometric invariance to the CNN is improved. A STM typically has three main components. A localization network learns automatically the spatial transformation that enhances accuracy (i.e., reinforcement learning). A grid generator generates a grid of coordinates in the input image data corresponding to each pixel from the output image. And, a sampler uses the parameters from the transformation and applies to the input image data to provide the spatially transformed image data. See e.g., Jaderberg, M., Simonyan, K., & Zisserman, A. (2015), "Spatial transformer networks," In *Advances in Neural Information Processing Systems* (pp. 2017-2025). The input image data (of the dataset) is spatially transformed, preferably by way of a STN, to a spatially transferred image data. In turn, it is this spatially transformed dataset that is used to train the machine learning classifier. Of course, the STM can be applied to the optional validation datasets.

The machine learner classifier is optimized. Preferably the CNN is optimized by stochastic optimization techniques. This may include Adadelta, Adagrad, Adam, Adamax, ASGD, L-BFGS and SGD. Adam is a preferred method for stochastic optimization herein. Briefly, Adam is an optimization algorithm that can be used to update network weights iteratively based on training data.

In one example, the classification architecture requires a small amount of data and operates on relatively high-resolution images. It can be a residual network pre-trained on ImageNet, but with higher resolution ($1024^2$) images than typical architectures. Such an approach helps find subtleties characteristic of steganographic features or MVLP Codes. As such, the batch size may be decreased in size and decrease the learning rate of the stochastic gradient descent optimizer.

The method comprises a step of obtaining a digital image of the subject consumer good having a subject product specification. One or more digital images is obtained by a digital image obtaining device such as a smart phone (e.g., iPhone), tablet (iPad), personal computer, or similar device that is preferably capable of capturing digital pictures and is directly or indirectly capable of electrically sending the image to the model. In another example, the digital image is obtained from a website (as to determine whether a counterfeiter is offering a non-authentic product at e-retailer website). Preferably the digital image is capable of capturing images such that the steganographic features are shown. The "product specification" includes the production code, batch code, brand name, product line, label, artwork, ingredient list, usage instructions, and combinations thereof. Preferably the product specification is selected from production code, batch code, and combination thereof. If the subject product is authentic, the product specification(s) will have one or more steganographic features that are captured in the digital image. Preferably the digital image data of the subject consumer good is spatially manipulated, preferably by STM, before being inputted into the model.

The method comprises a step of inputting the obtained image into a model, wherein the model is configured to classify the obtained image as authentic or non-authentic. The method of inputting depends in where the model resides. For example, the trained model may reside on the digital imaging obtaining device itself, or more preferably, in a remote location such as a server (e.g., cloud-based server). If the model is remote, inputting can be via a network (e.g., internet or cellular network or the like).

The method comprises the step of outputting output from the model classifying the image of the subject good as authentic or non-authentic. The output is preferably received on the same device that captured the image of the subject consumer good. Additional output may include providing instructions to the user how to report the non-authentic consumer good or where an authentic consumer good can be purchased, e.g., on-line or nearest off-line store. Preferably the method is accomplished within 5 seconds, preferably within 3 seconds, more preferably within 1 seconds; alternatively, from 1 to 5 seconds. In one aspect, of the invention, the data is only collected from the mobile device e.g. in a crowdsourcing activity and then processed internally to generate a real-time geo-located picture of counterfeits in the market with or without reporting the conclusion back to the user. In one example, the output indicates that the initial obtained image (that was inputted in the model) was inclusive and the user should obtain (and input) another image of the subject consumer product given that the analysis is inconclusive. And a better qualify image, or an image from another perspective etc., is needed for a before a final or more definitive classification of authenticity can be provided.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for classifying whether a subject consumer good is authentic or non-authentic comprising the steps:
   a) obtaining an image of the subject consumer good comprising a subject product specification;
   b) inputting the obtained image into a model;
      wherein the model is configured to classify the obtained image as authentic or non-authentic using at least one alphanumerical steganographic feature that has one or more alphanumeric characters modified from customary;
      wherein the model is constructed by a machine learning classifier;
      wherein the machine learning classifier is trained by a training dataset;
      wherein the training dataset comprises: (i) at least one extracted image of an authentic product comprising an authentic product specification comprising at least one alphanumerical steganographic feature having a length greater than 0.01 mm; and (ii) an associated class definition based on said alphanumerical steganographic feature of said authentic product specification of said authentic product; and
   c) outputting output from the model classifying the inputted image of the subject consumer good as authentic or non-authentic.

2. The method of claim 1, wherein the alphanumerical steganographic features has a length from 0.02 mm to 20 mm.

3. The method of claim 1 wherein the alphanumerical steganographic features has a length from 0.03 mm to 5 mm.

4. The method of claim 1, wherein the machine learning classifier is validated by a validating dataset, wherein the validating dataset comprises identification of the alphanumerical steganographic feature(s) of the authentic product specification generated by alphanumerical steganographic feature generating software.

5. The method of claim 1, wherein the training dataset comprises annotations annotating the alphanumerical steganographic feature(s).

6. The method of claim 1, wherein the alphanumerical steganographic feature is selected from: isolated font style for a letter or number or combination thereof; isolated location change of location of text, letter, punctuation, or combination thereof; and combinations thereof.

7. The method of any claim 1, wherein the alphanumerical steganographic features is automatically generated by way of software.

8. The method of claim 1, wherein the product specification is selected from the group consisting of production code, batch code, brand name, product line, label, artwork, ingredient list, usage instructions, and combinations thereof.

9. The method of claim 1, wherein the machine learning classifier is a convolutional neural network.

10. The method of claim 1, wherein the training dataset is spatially manipulated before training the machine learning classifier.

11. The method of claim 10, wherein the training dataset is spatially manipulated by way of a spatial transformer network.

12. The method of claim 11, wherein the training dataset emphasizes high frequency features.

13. The method of claim 1, wherein the obtained image of the subject consumer good is spatially manipulated before being inputted into the model.

14. The method of claim 13, wherein the obtained image is spatially manipulated by way of a spatial transformer network.

15. The method of claim 1, wherein obtaining an image of the subject consumer good is by way of a smart phone.

16. The method of claim 1, wherein the model resides on a cloud-based server.

17. A method for classifying whether a subject consumer good is authentic or non-authentic comprising the steps:
   a) obtaining an image of the subject consumer good comprising a subject product specification;
   b) inputting the obtained image into a model;
      wherein the model is configured to classify the obtained image as authentic or non-authentic using at least one alphanumerical steganographic feature that has one or more alphanumeric characters modified from customary;
      wherein the model is constructed by a machine learning classifier;
      wherein the machine learning classifier is trained by a training dataset;
      wherein the training dataset comprises: (i) at least one extracted image of an authentic product comprising an authentic product specification comprising alphanumerical Manufacturing Line Variable Printing Code; and (ii) an associated class definition based on said alphanumerical Manufacturing Line Variable Printing Code of said authentic product specification of said authentic product; and
   c) outputting output from the model classifying the inputted image of the subject consumer good as authentic or non-authentic.

18. The method of claim 17, wherein the alphanumerical Manufacturing Line Variable Printing Code is printed by a printing method selected from: continuous ink-jet; embossing, laser etching, thermal transferring, hot waxing, and combinations thereof.

* * * * *